(12) United States Patent
Quan et al.

(10) Patent No.: US 11,533,095 B2
(45) Date of Patent: Dec. 20, 2022

(54) DATA-DRIVEN BEAM TRACKING METHOD AND DEVICE FOR MOBILE MILLIMETER WAVE COMMUNICATION SYSTEM AND STORAGE MEDIUM

(71) Applicant: SHENZHEN UNIVERSITY, Shenzhen (CN)

(72) Inventors: Zhi Quan, Shenzhen (CN); Yuan Ma, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 17/311,681

(22) PCT Filed: Dec. 11, 2019

(86) PCT No.: PCT/CN2019/124539
§ 371 (c)(1),
(2) Date: Jun. 7, 2021

(87) PCT Pub. No.: WO2020/253156
PCT Pub. Date: Dec. 24, 2020

(65) Prior Publication Data
US 2022/0123804 A1    Apr. 21, 2022

(30) Foreign Application Priority Data

Jun. 21, 2019    (CN) .......................... 201910543566.1

(51) Int. Cl.
*H04B 7/06*    (2006.01)
(52) U.S. Cl.
CPC ................................ *H04B 7/0617* (2013.01)

(58) Field of Classification Search
CPC ........................... H04B 7/0617; H04B 7/0695
See application file for complete search history.

(56) References Cited

U.S. PATENT DOCUMENTS

| 2011/0136523 A1* | 6/2011 | Kim | ............ H04B 7/0617 455/501 |
| 2015/0244478 A1* | 8/2015 | Shirakata | ............ H04B 17/309 370/252 |

(Continued)

FOREIGN PATENT DOCUMENTS

| CN | 101971517 A | 2/2011 |
| CN | 102741710 A | 10/2012 |

(Continued)

OTHER PUBLICATIONS

International Search Report issued in corresponding International Application No. PCT/CN2019/124539, dated Jan. 27, 2021.

(Continued)

*Primary Examiner* — Kenneth T Lam
(74) *Attorney, Agent, or Firm* — Troutman Pepper Hamilton Sanders LLP

(57) ABSTRACT

Based on real-time measurement data, disclosed is a data-driven beam tracking solution for a mobile Millimeter Wave (mmWave) communication system. A disclosed data driving method is based on a dynamically linearized representation of a time-varying pseudo-gradient parameter estimation process. In the disclosure, an effective codebook design method is introduced, so that beam tracking may further be accelerated with a low overhead by beam rotation.

15 Claims, 4 Drawing Sheets

(56) References Cited

U.S. PATENT DOCUMENTS

2019/0281568 A1* 9/2019 Jung ................. H04W 16/28
2020/0186232 A1* 6/2020 Levitsky ............. H04B 7/0617

FOREIGN PATENT DOCUMENTS

| CN | 106537804 A | 3/2017 |
| CN | 110365383 A | 10/2019 |
| EP | 3185453 A1 | 6/2017 |
| WO | 2016044997 A1 | 3/2016 |

OTHER PUBLICATIONS

First Office Action issued in corresponding CN Application No. CN201910543566.1, dated Feb. 17, 2020, p. 1-5, Beijing, China.
Second Office Action issued in corresponding CN Application No. CN201910543566.1, dated Sep. 24, 2020, p. 1-4, Beijing, China.
Third Office Action issued in corresponding CN Application No. CN201910543566.1, dated Feb. 8, 2021, p. 1-4, Beijing, China.
Palacios, Joan et al. "Tracking mm-Wave Channel Dynamics: Fast Beam Training Strategies under Mobility", IEEE INFOCOM 2017—IEEE Conference on Computer Communications, Dec. 31, 2017 (Dec. 31, 2017), entire document.
The Extended European Search Report issued in corresponding EP Application No. EP19933796.5, dated Dec. 10, 2021.
Long Yin et al: "Data-Driven-Based Analog Beam Selection for Hybrid Beamforming Under mm-Wave Channels", IEEE Journal of Selected Topics in Signal Processing, IEEE, US, vol. 12, No. 2, May 1, 2018 (May 1, 2018), pp. 340-352, XP011684053, ISSN: 1932-4553, DOI: 10.1109/JSTP.2018.2818649; [retrieved on May 23, 2018] Section IV; p. 345-p. 347.
Ma Yuan et al: "Data-Driven Measurement of Receiver Sensitivity in Wireless Communication Systems", IEEE Transactions on Communications, IEEE Service Center, Piscataway, NJ. USA, vol. 67, No. 5, May 1, 2019 (May 1, 2019), pp. 3665-3676, XP011724445, ISSN: 0090-6778, DOI: 10.1109/TCOMM.2019.2891708; [retrieved on May 14, 2019] Algorighm 1; p. 3668.

\* cited by examiner (a) Beam patterns where $N_t = 64$, $N = 8$, $\delta = 1.93$ (b) Beam patterns where $N_t = 64$, $N = 16$, $\delta = 2.24$

DATA-DRIVEN BEAM TRACKING METHOD AND DEVICE FOR MOBILE MILLIMETER WAVE COMMUNICATION SYSTEM AND STORAGE MEDIUM

CROSS-REFERENCE TO RELATED APPLICATION(S)

This application is a continuation of International Application No. PCT/CN2019/124539, filed on Dec. 11, 2019, which claims priority to Chinese Patent Application No. 201910543566.1, filed on Jun. 21, 2019, the entire disclosures of which are hereby incorporated by reference.

TECHNICAL FIELD

The disclosure belongs to the field of wireless communication, and particularly to a data-driven beam tracking method and device for a mobile Millimeter Wave (mmWave) communication system and a storage medium.

BACKGROUND

With the emerging of 5th-Generation (5G) technologies and high-speed development of personal mobile communication technologies, an occupancy rate of a radio spectrum has increased, some frequencies of the radio spectrum have become saturated, and it is difficult to meet future communication requirements even though Gaussian Filtered Minimum Shift Keying (GMSK) modulation or various multiple access technologies are adopted to extend capacities of communication systems and increase a utilization rate of the spectrum. Therefore, developing new spectrum resources in a high band is an inevitable trend for implementation of high-speed and broadband wireless communication. Due to a small wavelength and a wide band, an mmWave can be adopted to effectively solve many realistic problems in a high-speed broadband wireless access technology and has broad application prospect.

An mmWave band is an important method for implementing high-speed connection. It provides an unlicensed bandwidth of several GHz, almost 200 times a bandwidth allocated to Wireless Fidelity (WiFi) and cellular networks. However, compared with a band lower than 6 GHz, mmWave radio is influenced by mobility and a dynamic environment. A path loss of a signal is inversely proportional to a wavelength. Due to a relatively small wavelength, a path loss at 60 GHz is 625 times a path loss at 2.4 GHz. Strength of an mmWave signal is rapidly reduced along with increase of a distance, so that a highly directional antenna is required to overcome a serious propagation loss.

A width of a directional beam formed based on a beamforming technology is small, and thus the directional beam is particularly sensitive to the mobility of User Equipment (UE). Reliable communication may be implemented only when a transmitter is in good beam alignment. Since a mobile state of UE is unknown, for finding an optimal weight vector, all possible beam directions are scanned in conventional exhaustive searching until an optimal beam direction is found. This process may bring a delay of a few seconds and thus is unsuitable for a mobile mmWave communication system. For executing accurate beamforming, a precoding algorithm may be developed through a basis pursuit technology by use of the sparsity of an mmWave channel. However, this method requires a transmitter to obtain channel information before precoding. Therefore, reliable channel estimation is required to calculate a weight vector. Because no directional beam is formed, when a Signal to Noise Ratio (SNR) is relatively low, the performance of a channel estimation algorithm is relatively poor.

For accelerating a beam tracking process without channel information, some rapid beam tracking solutions are proposed to adapt an array weight vector to a time-varying beam space channel. For example, for ensuring the quality of a communication link, an optimal weight vector is searched by use of a hierarchical codebook. Hierarchical searching is started with two wide beams, the beam that returns more power is checked, and then a space of this part is searched by the narrower beam. Hierarchical searching only requires a measurement count of a log level. However, in wide beam searching, adjacent signal directions may conflict in the same beam, conflicting signals are destructively combined to be canceled with each other, and consequently, a hierarchical algorithm may select a wrong direction and use a narrower beam for searching. For ensuring the reliability of mobile mmWave communication of a user, rapid beam tracking is required to adapt the array weight vector to the time-varying beam space channel. For finding an optimal beam alignment, all possible beam directions are scanned in a conventional exhaustive searching method, resulting in a delay of a few seconds, and thus the method is unsuitable for a mobile mmWave communication system. The disclosure discloses a data driving method for tracking a beam space channel based on a dynamically linearized representation of a time-varying pseudo-gradient parameter estimation process. Unlike a conventional model-based method requiring channel information before precoding, the data driving method disclosed in the disclosure only depends on Input/Output (I/O) measurement data. Based on shortcomings of a conventional art, the disclosure discloses a data-driven beam tracking method. An optimal beam vector may be found to reduce the alignment time. A motive of the disclosure is observing that an adaptive beam tracking process may be modeled to a general discrete nonlinear system. Unlike the model-based method, the data driving method only depends on real-time I/O measurement data and does not require explicit or implicit use of system structure or dynamic information. According to the disclosed beam tracking solution, a tracking error is minimized by a series of equivalent local dynamic linearizations of a time-varying parameter called a Pseudo-Partial Derivative (PPD) to search the optimal beam. A step length and the PPD parameter may be estimated only by use of online I/O measurement data. For accelerating the beam tracking process, in the disclosure, the beam vector used in the data-driven beam tracking solution is generated by use of a multi-resolution beamforming codebook. A simulation result shows that, through the method, the quality of the communication link may be ensured, and meanwhile, tracking time of the time-varying beam space channel may be reduced. In the disclosure, $(\bullet)^T$ and $(\bullet)^H$ represent transpose and conjugate transpose respectively, E represents an expected operator, £ represents a set of complex numbers, and o represents a Hadamard product.

A series of data test and experimental numerical analysis related to the disclosure shows that, compared with a conventional solution, the data-driven beam tracking method disclosed in the disclosure has the advantages of higher tracking performance and shorter alignment time.

SUMMARY

The disclosure aims to provide a data-driven beam tracking method and device for a mobile mmWave communication system and a storage medium.

In order to achieve the purpose, the technical solutions of the disclosure are as follows. A data-driven beam tracking method for a mobile mmWave communication system is provided. The method is characterized by including the following steps:

1: a pre-measurement dataset is preset to be $W=[\omega(1), \omega(2)]$, $\Gamma=[\gamma(1), \gamma(2)]$;

2: a target SNR is preset to be $\gamma^*$;

3: a tracking error is preset to be $\delta$;

4: a small positive constant is preset to be $\sigma$;

5: a maximum measurement iteration count is preset to be $t_{max}$;

6: differential evolution algorithm-based estimation parameters are preset to be $\varphi(0)$, $\eta$, $\rho$, $\mu$ and $\lambda$;

the following steps are executed for data-driven beam tracking:

7: $t=1$, $\hat{\varphi}(k)=\varphi(0)$, for $t<t_{max}$;

8: $\hat{\varphi}(k+1) = \hat{\varphi}(k) + \frac{\eta\Delta\omega(k)}{\mu + \|\Delta\omega(k)\|^2}[\Delta\gamma(k) - \hat{\varphi}^T(k)\Delta\omega(k)]$ is calculated;

9: if $\text{sign}(\hat{\varphi}(k+1)) \neq \text{sign}(\varphi(0))$ or $\|\Delta\omega(k)\|^2 < \sigma$, it is determined that $\hat{\varphi}(k+1)=\varphi(0)$;

10: $\omega(k+1) \leftarrow \omega(k) + \frac{\rho\hat{\varphi}(k+1)}{\lambda + \|\hat{\varphi}(k+1)\|^2}[\gamma^* - \gamma(k)]$, and $\gamma(k+1)$ is calculated for given $\omega(k+1)$ at UE;

11: if $|\gamma(k+1)-\gamma^*| \leq \delta$, calculation is stopped, $\Gamma(k+1) \leftarrow [\Gamma(k), \gamma(k+1)]$ $W \leftarrow [W, \omega(k+1)]$ $t \leftarrow t+1$, $k \leftarrow k+1$, and $\gamma(k)$ is returned, where $\gamma(k)$ is a received SNR at the UE, $\omega(k)$ is an array weight vector, $\hat{\varphi}(k)$ is a PPD, $(\cdot)^T$ represents transpose, and $\Delta\gamma(k)=\gamma(k)-\gamma(k-1)$, $\Delta\omega(k)=\omega(k)-\omega(k-1), \Delta\omega(k)\neq 0$.

Preferably, in the disclosure, an array steering vector is added to a quantified angle subset to design a codebook $W=\{\omega(1), \omega(2), \ldots, \omega(N)\}$ into:

$$W = \left\{\frac{1}{\sqrt{N_t/N}}\sum_{p=1}^{N_t/N} u_t(\theta_p)e^{j\delta p},\right.$$

$$\left.\frac{1}{\sqrt{N_t/N}}\sum_{p=N_t/N+1}^{2N_t/N} u_t(\theta_p)e^{j\delta p}, \ldots, \frac{1}{\sqrt{N_t/N}}\sum_{p=N_t-N_t/N+1}^{N_t} u_t(\theta_p)e^{j\delta p}\right\},$$

where N is the number of codewords in the codebook, and $\delta$ is a variable configured to control an array weight to keep a main lobe directivity gain constant as much as possible.

Preferably, in the disclosure, for further reducing the complexity of beam tracking, weight vectors that are the same in shape but different in turning angle are generated by use of a beam rotation technology, all the weight vectors being calculated only based on the same weight vector:

$\omega(i)=\omega(1) o \sqrt{N_t} u_t((i-1)\Psi)$, where, for $2 \leq i \leq N$, o represents a Hadamard product, and $\Psi$ is a beam width of the weight vector in the codebook.

Preferably, in the disclosure, a form of the array steering vector is:

$$u_t(\theta_n) = \frac{1}{\sqrt{N_t}}\left[1, e^{-j2\pi\frac{d}{\lambda}\theta_n}, \ldots, e^{-j2\pi(N_t-1)\frac{d}{\lambda}\theta_n}\right]^T =$$

$$\frac{1}{\sqrt{N_t}}\left[1, e^{-j\frac{2\pi}{N_t}\left(n-\frac{N_t+1}{2}\right)}, e^{-j\frac{2\pi}{N_t}2\left(n-\frac{N_t+1}{2}\right)}, \ldots, e^{-j\frac{2\pi}{N_t}(N_t-1)\left(n-\frac{N_t+1}{2}\right)}\right]^T.$$

Preferably, in the disclosure, the PPD $\hat{\psi}(k)$ is a PPD measured for the k-th time, $\|\hat{\varphi}(k)\|^2 \leq c$.

Preferably, in the disclosure, the PPD parameter $\hat{\varphi}(k)$ is estimated by use of an improved projection algorithm; a standard function for PPD estimation is $J(\hat{\varphi}(k))=|\Delta\gamma(k-1)-\hat{\varphi}^T(k)\Delta\omega(k-1)|^2+\mu\|\hat{\varphi}^T(k)-\hat{\varphi}^T(k-1)\|^2$, where $\mu>0$ is a weight factor; and an optimal condition $$\frac{\partial J(\hat{\varphi}(k))}{\partial \hat{\varphi}(k)} = 0$$

is solved to obtain $$\hat{\varphi}(k+1) = \hat{\varphi}(k) + \frac{\eta\Delta\omega(k)}{\mu + \|\Delta\omega(k)\|^2}[\Delta\gamma(k) - \hat{\varphi}^T(k)\Delta\omega(k)],$$

where $\eta$ is a step length constant.

In addition, the disclosure also provides a data-driven beam tracking device for a mobile mmWave communication system. The data-driven beam tracking device includes at least one processor and a memory. The memory is coupled to the at least one processor and stores at least one computer executable instruction thereon which, when executed by the at least one processor, causes the at least one processor to execute the above data-driven beam tracking device method.

Furthermore, the disclosure provides a non-transitory computer-readable storage medium. The non-transitory computer readable storage medium is configured to store a computer program which, when executed by a processor, causes the processor to execute the above data-driven beam tracking device method.

The disclosure discloses a beam tracking solution for weight adaptation only based on real-time measurement data for the applicant observes that an adaptive beam tracking process may be simulated to a general discrete nonlinear system process. For preventing communication from being interrupted due to the mobility of a user, the disclosure discloses the data-driven beam tracking solution to track a time-varying beam space channel for a purpose of finding a candidate beam vector $\omega(k)$ to achieve the target SNR $\gamma$ for reliable communication between a Base Station (BS) and the user. Based on the real-time measurement data, the disclosure discloses the data-driven beam tracking solution for the mobile mmWave communication system. A disclosed data driving method is based on a dynamically linearized representation of a time-varying pseudo-gradient parameter estimation process. In the disclosure, an effective codebook design method is introduced, so that beam tracking may further be accelerated with a low overhead by beam rotation. A simulation result of the disclosure shows that, through the solution, tracking performance higher than that of an existing reliable communication solution may be achieved.

DETAILED DESCRIPTION

For understanding the technical solutions of the disclosure better, the embodiments of the disclosure will be described below in combination with the drawings in detail.

It should be clear that the described embodiments are not all of the embodiments but only part of the embodiments of the disclosure. All other embodiments obtained by those of ordinary skill in the art on the basis of the embodiments in the disclosure without creative work shall fall within the scope of protection of the disclosure.

Terms used in the embodiments of the disclosure are adopted not to limit the disclosure but only to describe purposes of specific embodiments. "One", "said" and "the" in a singular form in the embodiments and appended claims of the disclosure are also intended to include a plural form, unless other meanings are clearly expressed in the context.

It should be understood that term "and/or" used in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It should be understood that, although terms first, second and the like may be adopted to describe methods and corresponding devices in the embodiments of the disclosure, these keywords should not be limited to these terms. These terms are only adopted to distinguish the keywords. For example, without departing from the scope of the embodiments of the disclosure, a first beam tracking method and corresponding device may also be called a second beam tracking method and corresponding device, and similarly, the second beam tracking method and corresponding device may also be called the first beam tracking method and corresponding device.

Depending on the context, term "if" used herein can be explained as "while" or "when" or "responsive to determining" or "responsive to detecting". Similarly, depending on the context, phrase "if determining" or "if detecting (an expressed condition or event)" can be explained as "when determining" or "responsive to determining" or "when detecting (the expressed condition or event)" or "responsive to detecting (the expressed condition or event)".

Figure 1:
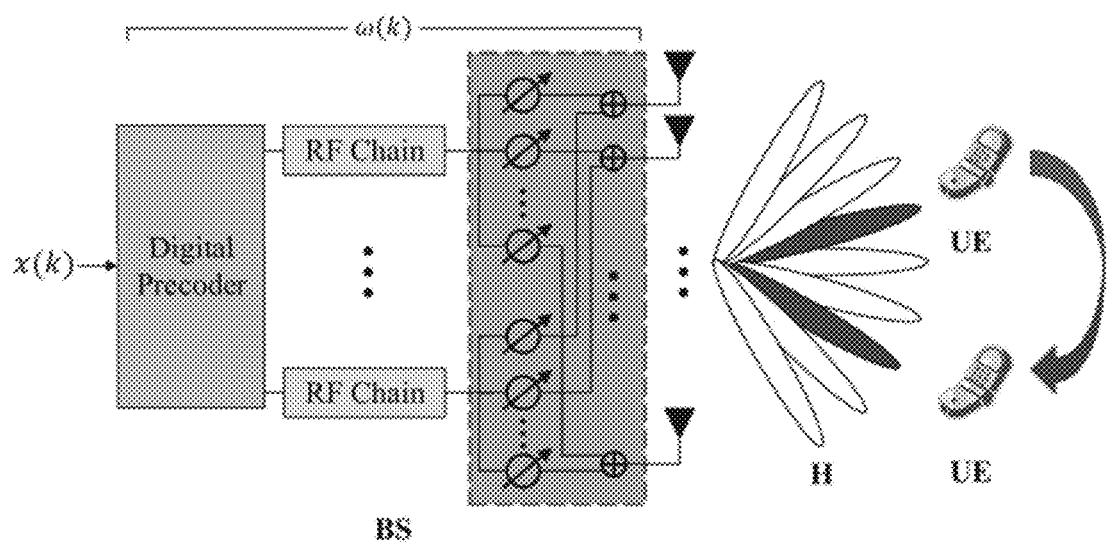
FIG. 1 is one of block diagrams of an mmWave Multiple Input Single Output (MISO) system according to the disclosure.

As shown in FIG. 1 in the specification, an mmWave MISO system includes a ULA with $N_t$ transmitting antennae at a BS and a single receiving antenna at mobile UE. A received signal in a downlink at a k-th moment may be represented through the following formula:

$$n(k) = \sqrt{P} h_t^T \omega(k) x(k) + n(k),$$

where P is transmitted power, $h_t \in \mathbb{C}^{N_t \times 1}$ is a channel vector, $\omega(k) \in \mathbb{C}^{N_t \times 1}$ is an array weight vector at the BS, $x(k)$ is a transmission symbol with normalized power, and $n(k) \sim \mathcal{CN}(0, \sigma_n^2)$ is an Additive White Gaussian Noise (AWGN). Therefore, an SNR at the UE is:

$$\gamma(k) = 10 \log_{10} \left( \frac{|\sqrt{P} h_t^T \omega(k) x(k) + n(k)|}{|n(k)|^2} \right).$$

Since an expected mmWave channel has limited scattering, a geometrical channel model with L paths between the BS and the UE is adopted in the disclosure, and it is represented through the following formula, where $g_l$ is a complex gain of the l-th path, and $u_t(\cdot)$ is an array steering vector, namely $$u_t(\theta_t^l) = \frac{1}{\sqrt{N_t}} \left[ 1, e^{-j 2\pi \frac{d}{\lambda} \theta_t^l}, \ldots, e^{-j(N_t-1) 2\pi \frac{d}{\lambda} \theta_t^l} \right]^T$$

$$h_t = \sqrt{N_t} \sum_{l=1}^{L} g_l u_t(\theta_t^l),$$

where d is a distance between adjacent antenna arrays, $\lambda$ is a propagation wavelength, $\theta_t^l \in (-1, 1)$ represents that a spatial frequency is $\theta_t^l = \sin \alpha_t^l$, and $\alpha_t^l \in (-\pi/2, \pi/2)$ represents an angle of departure. In the disclosure, a channel matrix $h = Ag$ may be rewritten in a matrix form, where $g = [g_1, g_2, \ldots, g_L]^T \in \mathcal{L}^{L \times 1}$, $A = [u_t(\alpha_t^1), u_t(\alpha_t^2), \ldots, u_t(\alpha_t^L)] \in \mathcal{L}^{N_t \times L}$.

Based on beamforming, directional narrow beams for mmWave communication may be formed by use of multiple antennae. Therefore, beams between a transmitter and a receiver are required to be aligned well for high-quality communication. At present, a solution to beam alignment requires a whole space to be scanned to try various beams until optimal beams are found, and particularly for mobile UE, such a long delay makes it difficult to implement deployment of mmWave links.

Figure 2:
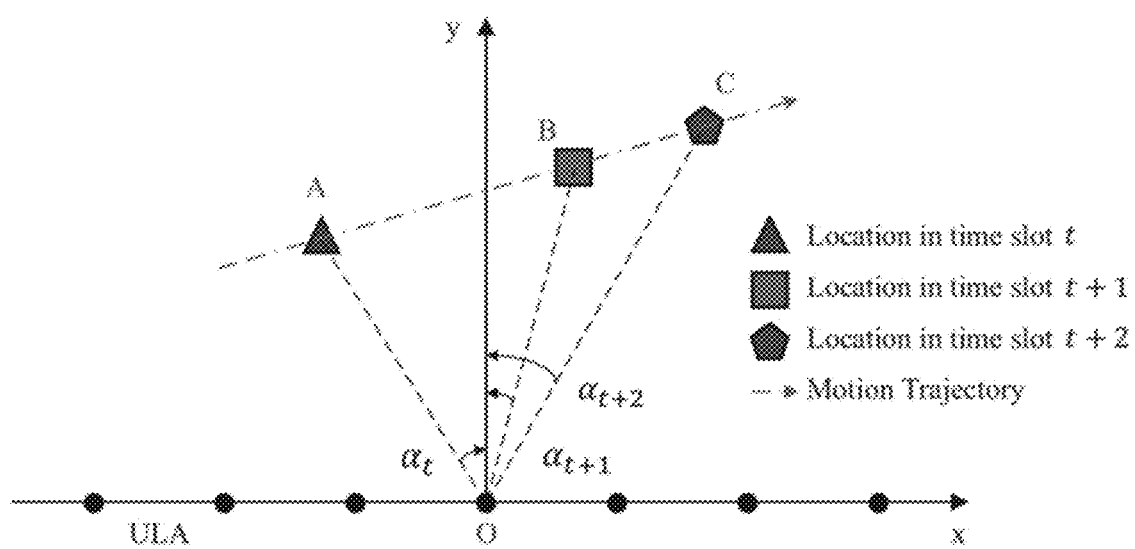
FIG. 2 is one of geometrical relationships between a Uniform Linear Array (ULA) of a BS and mobile UE according to the disclosure.

Generally, in the disclosure, a center of the ULA of the BS is considered as the origin, and directions parallel and perpendicular to the ULA are hypothesized to be the x axis and the y axis respectively. Then, a geometrical relationship between the ULA and the mobile UE may be represented in FIG. 2, where $\alpha_t$ is a physical direction between the ULA and the UE in a slot t.

Figure 3:
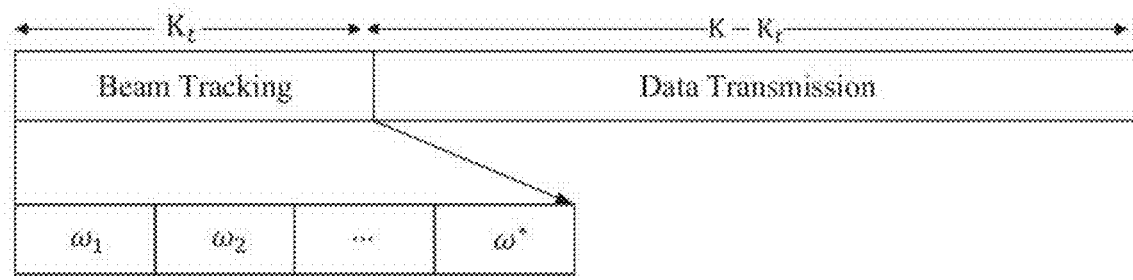
FIG. 3 is one of frame structures for beam tracking and data transmission in channel coherence time according to the disclosure.

As shown in FIG. 3, there is made such a hypothesis that K continuous symbols are sent in channel coherence time. In the K transmission symbols, $K_t$ ($K_t$ out of K) symbols are configured for beam tracking. In a tracking period, namely $1 \le K \le K_t$, the BS selects one of $K_t$ weight vectors to achieve a target SNR $\gamma^*$ for reliable communication between the BS and the user. Then, the selected weight vector is adopted for data transmission (namely $1 \le K \le K_t$).

In the disclosure, a beam tracking solution for weight adaptation only based on real-time measurement data is disclosed. The disclosure is conceived for the applicant observes that an adaptive beam tracking process may be simulated to a general discrete nonlinear system process, and a relationship between an array weight vector ω(k) and a received SNR may be described as follows through a given general discrete time system:

$$\gamma(k)=f(\gamma(k-1), \ldots, \gamma(k-n_p), \omega(k), \ldots, \omega(k-n_s)),$$

where γ(k) is the received SNR at the UE at the k-th moment, $n_p$ and $n_s$ are any reasonable unknown orders, and f(•) is an unknown nonlinear function.

A dynamically linearized representation of a nonlinear system is based on the following hypotheses. A first hypothesis is that f(•) is continuous relative to a partial derivative of ω(k). A second hypothesis is that the system is Lipschitz. For example, for any k, |Δs(k)|≤||Δω(k)||, where Δγ(k)=γ(k)−γ(k−1), Δω(k)=ω(k)−ω(k−1), Δω(k)≠0, and c is a positive constant.

A first theorem: for a nonlinear system meeting the first hypothesis and the second hypothesis, there is undoubtedly a parameter $\hat{\varphi}(k)$ called a PPD, and in such case, the system may be converted to the following equivalent dynamic linearization data model:

$$\Delta\gamma(k)=\hat{\varphi}^T(k)\Delta\omega(k),$$

where $\hat{\varphi}(k)=[\hat{\varphi}_1(k), \hat{\varphi}_2(k), \ldots, \hat{\varphi}_{N_t}(k)]^T$ is a PPD measured for the k-th time, $\|\hat{\varphi}(k)\|^2 \leq c$.

From a realistic angle, the hypotheses are correct. The first hypothesis is a typical condition of a general nonlinear system. Since a change rate of the array weight vector ω(k) of the system is limited, f(g) may be reasonably hypothesized to be continuous relative to the partial derivative of ω(k). According to the law of energy conservation, a limited change of input energy may not cause an unlimited change of output energy. Therefore, in the disclosure, the second hypothesis is reasonable.

For preventing communication from being interrupted due to the mobility of the user, the disclosure discloses a data-driven beam tracking solution to track a time-varying beam space channel for a purpose of finding a candidate beam vector ω(k) to achieve the target SNR γ* for reliable communication between the BS and the user. In the disclosure, the following standard function is considered:

$$J(\omega(k))=|\gamma^*-\gamma(k)|^2+\lambda\|\Omega(k)-\omega(k-1)\|^2$$

where λ is a weight factor. The formula is rewritten into:

$$\gamma(k)=\gamma(k-1)+\hat{\varphi}^T(k)\Delta\omega(k)$$

An optimal condition $$\frac{\partial J(\omega(k))}{\partial \omega(k)} = 0$$

is solved to obtain $$\omega(k+1) = \omega(k) + \frac{\rho\hat{\varphi}(k+1)}{\lambda + \|\hat{\varphi}(k+1)\|^2}[\gamma^* - \gamma(k)],$$

where ρ is a step length constant.

It is to be noted that the parameter $\hat{\varphi}(k)$ in the formula is unknown but related to a system input and output until the moment k. Therefore, $\hat{\varphi}(k)$ may be considered as a time-varying parameter. In the disclosure, the PPD parameter $\hat{\varphi}(k)$ is estimated by use of an improved projection algorithm. The standard function for PPD estimation is defined as $$J(\hat{\varphi}(k))=|\Delta\gamma(k-1)-\hat{\varphi}^T(k)\Delta\omega(k-1)|^2+\mu\|\hat{\varphi}^T(k)-\hat{\varphi}^T(k-1)\|^2,$$

where μ>0 is the weight factor. The optimal condition $$\frac{\partial J(\hat{\varphi}(k))}{\partial \hat{\varphi}(k)} = 0$$

is solved to obtain $$\hat{\varphi}(k+1) = \hat{\varphi}(k) + \frac{\eta\Delta\omega(k)}{\mu + \|\Delta\omega(k)\|^2}[\Delta\gamma(k) - \hat{\varphi}^T(k)\Delta\omega(k)],$$

where η is the step length constant. For accurately tracking the iterative varying parameter $\hat{\varphi}(k)$ and ensuring that Δω(k)≠0, the following resetting solution is adopted:

$$(k+1)=\varphi(0) \text{ if } \text{sign}(\hat{\varphi}(k+1))\neq\text{sign}(\varphi(0)), \text{ or}$$
$$\|\Delta\omega(k)\|^2<=\sigma$$

where φ(0) is an initial value of a first element of the PPD, and σ is a small positive constant. If $\|\Delta\omega(k)\|^2$ is too small, $\hat{\varphi}(k)$ is reset. Through the resetting solution, a tracking capability of an estimation algorithm may be improved.

The following data-driven beam tracking method disclosed in the disclosure includes main steps of a preferred embodiment of the disclosure.

Codebook Design

For accelerating beam tracking with a low overhead, the disclosure discloses a novel multi-resolution beamforming codebook design method. Considering a quantified space angle $$\left\{\theta_n = -1 + \frac{2n-1}{N_t} : 1 \leq n \leq N_t\right\},$$

a form of the array steering vector is:

$$u_t(\theta_n) = \frac{1}{\sqrt{N_t}}\left[1, e^{-j\frac{2\pi}{N_t}\left(n-\frac{N_t+1}{2}\right)}, e^{-j\frac{2\pi}{N_t}2\left(n-\frac{N_t+1}{2}\right)}, \ldots, e^{-j\frac{2\pi}{N_t}(N_t-1)\left(n-\frac{N_t+1}{2}\right)}\right]^T.$$

As one embodiment, a data-driven beam tracking algorithm is as follows.

It is set that:

1: a preset pre-measurement dataset is W=[ω(1),ω(2)], Γ=[γ(1), γ(2)],

2: a target SNR is γ*,

3: a tracking error is ò,

4: a small positive constant is σ,

5: a maximum measurement iteration count is $t_{max}$, and

6: differential evolution algorithm-based estimation parameters are φ(0), η, ρ, μ and λ.

The following steps are executed for data-driven beam tracking:

7: $t=1$, $\hat{\varphi}(k)=\hat{\varphi}(0)$, for $t<t_{max}$;

8: $\hat{\Phi}(k) = \hat{\Phi}(k-1) + \frac{\eta \Delta\omega(k-1)}{\mu + \|\Delta\omega(k-1)\|^2}[\Delta\gamma(k-1) - \hat{\Phi}^T(k-1)\Delta\omega(k-1)]$ is calculated;

9: if $\text{sign}(\hat{\varphi}_1(k+1)) \neq \text{sign}(\hat{\varphi}_1(0))$ or $\|\Delta\omega(k)\|^2 <= \sigma$ or $|\hat{\varphi}_1(k+1)| <= \sigma$, it is determined that $\hat{\varphi}_1(k+1) = \hat{\varphi}_1(0)$;

10: $\omega(k+1) \leftarrow \omega(k) + \frac{\rho \hat{\Phi}(k+1)}{\lambda + \|\hat{\Phi}(k+1)\|^2}[\gamma^* - \gamma(k)]$, and $\hat{\gamma}(k+1)$ is calculated for given $\omega(k+1)$ at UE;

11: if $|\hat{\gamma}(k+1)-\gamma^*| \leq \delta$, calculation is stopped,
$\Gamma(k+1) \leftarrow [\Gamma(k), \gamma(k+1)]$
$W \leftarrow [W, \omega(k+1)]$; and
$t \leftarrow t+1, k \leftarrow k+1$
$\gamma(k)$ is returned.

The array steering vector is added to a quantified angle subset to design a codebook $W=\{\omega(1), \omega(2), \ldots, \omega(N)\}$ into:

$$W = \left\{ \frac{1}{\sqrt{N_t/N}} \sum_{p=1}^{N_t/N} u_t(\theta_p)e^{j\delta p}, \frac{1}{\sqrt{N_t/N}} \sum_{p=N_t/N+1}^{2N_t/N} u_t(\theta_p)e^{j\delta p}, \ldots, \frac{1}{\sqrt{N_t/N}} \sum_{p=N_t-N_t/N+1}^{N_t} u_t(\theta_p)e^{j\delta p} \right\}$$

where N is the number of codewords in the codebook, and δ is a variable configured to control an array weight to keep a main lobe directivity gain constant as much as possible. For further reducing the complexity of beam tracking, in the disclosure, weight vectors that are the same in shape but different in turning angle are generated by use of a beam rotation technology. Therefore, in the disclosure, all the weight vectors may be calculated only based on the same weight vector, as follows:

$\omega(i) = \omega(1) \circ \sqrt{N_t} u_t((i-1)\psi)$, where, for $2 \leq i \leq N$, $\circ$ represents a Hadamard product, and $\psi$ is a beam width of the weight vector in the codebook.

Figure 4:
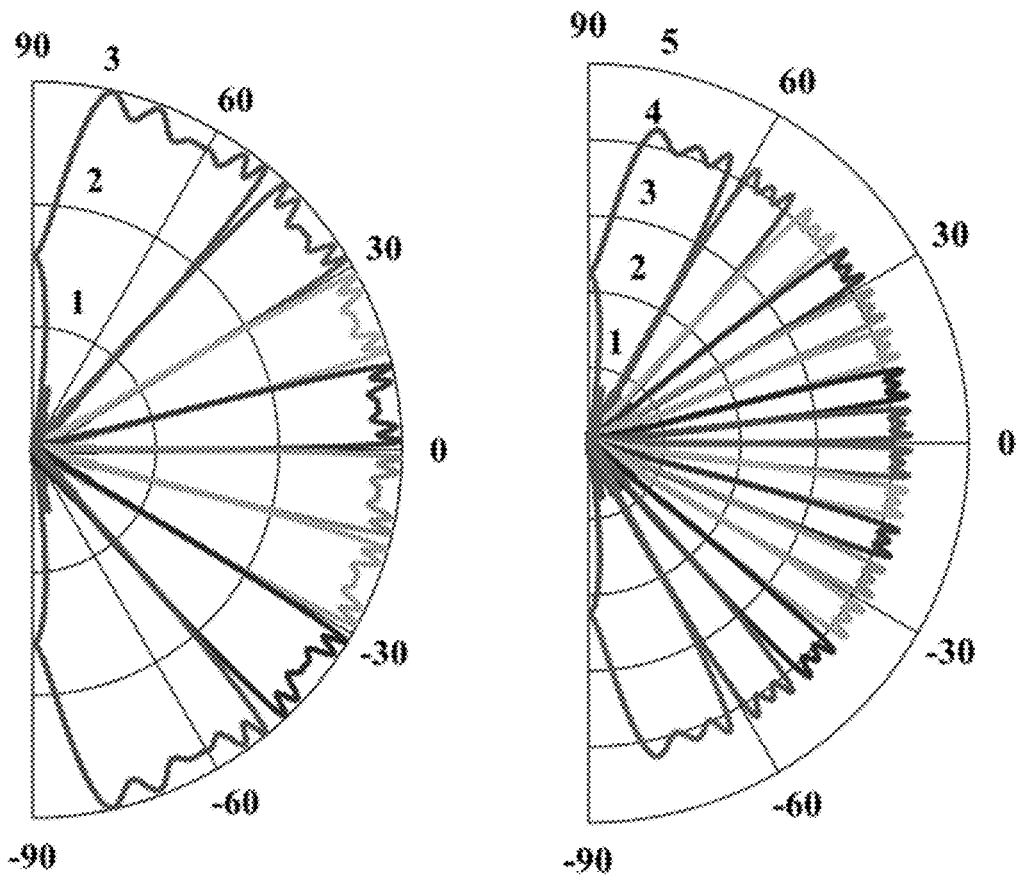
FIG. 4 is one of beam patterns in a continuous space domain according to the disclosure.

FIG. 4 shows an example of a disclosed beam pattern for codebook design. In the disclosure, it is observed from FIG. 4 that the disclosed beam pattern has an almost constant main lobe directivity gain of each beam.

As part of a preferred specific embodiment, a numerical analysis process is as follows.

Numerical analysis may be implemented as a part of the preferred embodiment of the disclosure to illustrate, explain and estimate the technical effects of the data-driven beam tracking solution disclosed in the disclosure. For performance evaluation, the disclosed solution is compared with conventional exhaustive searching and hierarchical searching algorithms in the disclosure. That is, in the disclosure, the solutions are described and compared at first, and then obtained simulation results are presented and discussed.

In the solution disclosed in the disclosure, there is made such a hypothesis that the BS is provided with a ULA with $N_t=64$ antennae, wherein 1) the number of paths between the BS and the UE is set to be L=3, including a Line Of Sight (LOS) path and two Non Line Of Sight (NLOS) paths;
2) when $2 \leq l \leq 3$;
3) the transmitted power is P=30 mW; and
4) the target SNG is s*=20 dB for establishment of reliable communication.

As part of a preferred specific embodiment, the solution disclosed in the disclosure is compared with the following solutions.

Figures 5, 6:
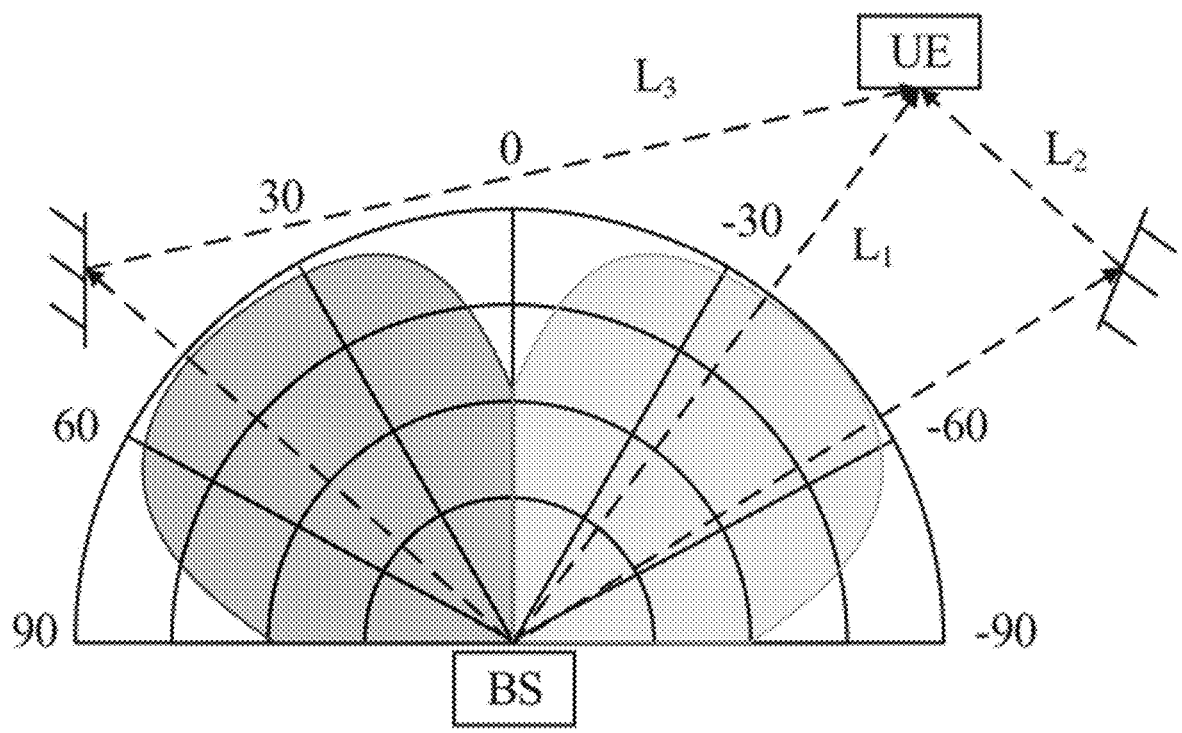
FIG. 5 is a schematic diagram of beam coverage of a multi-resolution hierarchical codebook according to the disclosure.
FIG. 6 is one of examples of multi-path hierarchical searching according to the disclosure.

Hierarchical searching: as shown in FIG. 5 in the specification, in hierarchical searching, $2^m$ codewords in an mth layer are created at the BS. The ith codeword in the mth layer is represented. The BS executes bidirectional tree searching on the mth layer to find an optimal beamforming codeword. In each layer, the BS has two candidate beamforming codewords, and they are two sub codewords of a parent codeword found in a previous layer. Then, a codeword with a relatively high SNR is selected as a parent codeword of a next layer. Compared with a codeword in a relatively low layer, a codeword in a relatively high layer may obtain a relatively narrow beam main lobe with a relatively high directivity gain.

However, during a practical application, hierarchical searching is relatively low in robustness. In wide beam searching in a previous layer, adjacent signal directions may conflict in the same beam. Therefore, conflicting signals may be destructively combined to cancel power of each other. As shown in FIG. 6 in the specification, paths L1 and L2 are close in direction and thus may conflict in the same wide beam. There is made such a hypothesis that L1 and L2 are opposite in phase, and power of each other may be canceled, so that a signal (for example, direction 90° to 0°) sent through the left beam has higher power. Consequently, a hierarchical algorithm may exaggerate a wrong direction and use a narrower beam for searching.

Total Measurement Count for Beam Tracking

Figure 7:
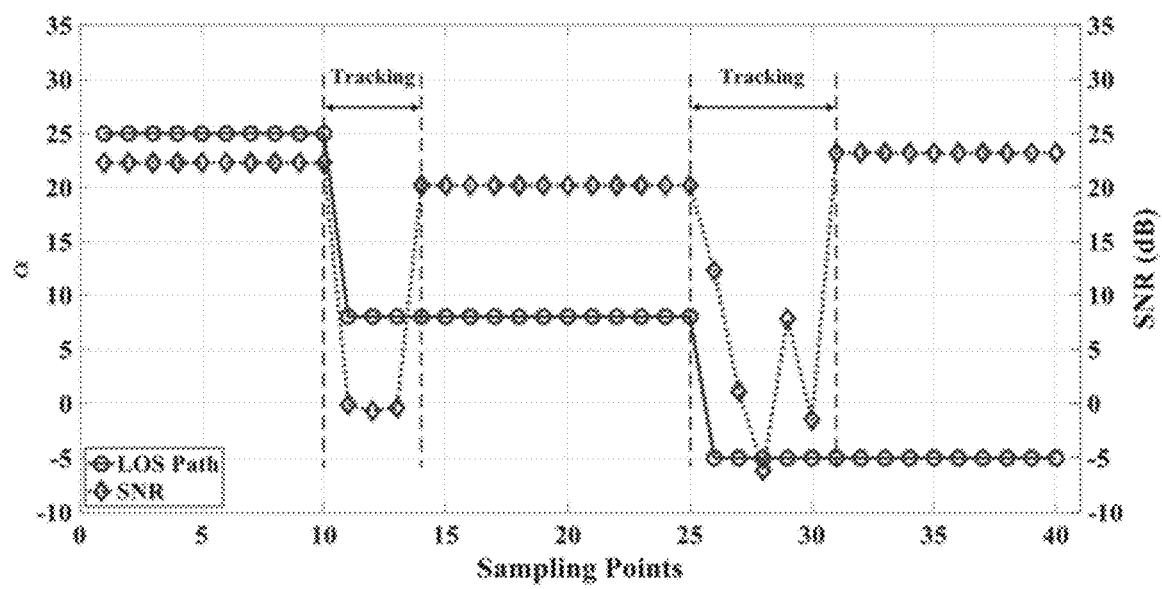
FIG. 7 is a schematic diagram of data-driven beam tracking according to a preferred embodiment of the disclosure.

For ensuring communication quality, it is necessary to regulate a beam direction at the BS according to a position of the UE. As shown in FIG. 7 in the specification, there is made such a hypothesis that an initial beam alignment has been established, and a physical direction α between the BS and the UE is 250 and the SNR at the UE is 22 dB. Then, α changes along with movement of the UE, so that the SNR at the UE is reduced remarkably.

TABLE I

Comparison of Measurement Counts

| The Number of Codewords N | Proposed Approach | Exhaustive Search | Hierarchical Scheme |
| --- | --- | --- | --- |
| 8 | 2.4 | 8 | 6 |
| 16 | 3.8 | 16 | 8 |
| 32 | 6.5 | 32 | 10 |

TABLE II

Comparison of Measurement Counts of Data-Driven Method Disclosed in the Disclosure under Different Mobile Ranges of UE

| The Number of Codewords N | $\alpha \in [-10°, 30°]$ | $\alpha \in [-20°, 40°]$ | $\alpha \in [-30°, 50°]$ |
|---|---|---|---|
| 8 | 2.4 | 3.4 | 4.5 |
| 16 | 3.8 | 5.8 | 6.9 |
| 32 | 6.5 | 9.7 | 12.4 |

For ensuring the reliability of communication under movements of the user, rapid beam tracking is executed based on the disclosed data driving method. Based on real-time measurement, the BS obtains an optimal beam direction with a highest SNR.

Then, measurement counts required by finding an optimal codeword in the disclosed method, the exhaustive searching method and the hierarchical searching method are compared. As shown in Table I, measurement iterations fewer than those in the exhaustive searching and hierarchical algorithms are required in the disclosed data driving solution to implement convergence to the optimal beam direction.

In Table II, total measurement counts required to ensure reliable communication in the disclosed method under different mobile ranges of the UE are compared. When $\alpha=10°$, the initial beam alignment has been established. It can be observed from Table II that the total measurement count increases along with the widening of the mobile range of the mobile UE.

Based on the real-time measurement data, the disclosure discloses the data-driven beam tracking solution for the mobile mmWave communication system. The disclosed data driving method is based on the dynamically linearized representation of the time-varying pseudo-gradient parameter estimation process. In the disclosure, an effective codebook design method is introduced, so that beam tracking may further be accelerated with a low overhead by beam rotation. A simulation result of the disclosure shows that, through the solution, tracking performance higher than that of an existing reliable communication solution may be achieved.

Furthermore, the disclosure provides a data-driven beam tracking device for a mobile mmWave communication system. The data-driven beam tracking device includes at least one processor and a memory. The memory is coupled to the at least one processor and stores at least one computer executable instruction thereon which, when executed by the at least one processor, causes the at least one processor to execute the above data-driven beam tracking device method.

Furthermore, the disclosure provides a non-transitory computer-readable storage medium. The non-transitory computer readable storage medium is configured to store a computer program which, when executed by a processor, causes the processor to execute the above method.

In all the abovementioned implementation modes, for meeting requirements of some special data transmission and read/write functions, devices, modules, apparatuses, hardware, pin connections or memories and processors may be added in an operating process of the method and to the corresponding device to extend different functions.

Those skilled in the art may clearly learn about that, for convenient and brief description, specific working processes of the method, device and unit described above may refer to the corresponding processes in the method embodiments and will not be elaborated herein.

In the embodiments provided by the disclosure, it is to be understood that the disclosed system, device and method may be implemented in other manners. For example, the device embodiment described above is only schematic. For example, division of the method steps is only logical or function division and another division manner may be adopted during practical implementation. For example, multiple units or components may be combined or integrated into another system or some characteristics may be neglected or not executed. In addition, coupling, direct coupling or communication connection between the displayed or discussed components may be implemented through indirect coupling or communication connection of some interfaces, devices or units, and may be in an electrical form or other forms.

The units described as each step of the method and separate parts of the device may or may not be separate logically or physically, and may also not be physical units, that is, they may be located in the same place, or may also be distributed to multiple network units. Part or all of the units may be selected to achieve the purpose of the solutions of the embodiments according to a practical requirement.

In addition, each step of the method, implementation thereof and the functional units in each embodiment of the disclosure may be integrated into a processing unit, each unit may also physically exist independently, and two or more than two units may also be integrated into a unit. The integrated unit may be implemented in a hardware form and may also be implemented in form of a combined hardware and software functional unit.

The integrated unit, that may be implemented in form of software function unit, of the method and the device may be stored in a computer-readable storage medium. The software function unit is stored in a storage medium, including a plurality of instructions configured to enable a computer device (which may be a personal computer, a server or a network device, etc.) or a processor to execute part of the steps of the method in each embodiment of the disclosure. The storage medium includes various media capable of storing program codes such as a U disk, a mobile hard disk, a Read-Only Memory (ROM), a Random Access Memory (RAM), a magnetic disk or an optical disk.

The above is only the preferred embodiment of the disclosure and not intended to limit the disclosure. Any modifications, equivalent replacements, improvements and the like made within the spirit and principle of the disclosure shall fall within the scope of protection of the disclosure.

It is to be noted that the above embodiments are adopted not to limit but only to describe the technical solutions of the disclosure more clearly. Although the disclosure is described with reference to the embodiments in detail, those of ordinary skill in the art should know that the technical solutions recorded in each embodiment may also be modified or part of the technical features therein may be equivalently replaced, and the technical solutions corresponding to these modifications or replacements do not depart from the scope and spirit of the technical solutions of each embodiment of the disclosure.

The invention claimed is:

1. A data-driven beam tracking method for a mobile Millimeter Wave (mmWave) communication system comprising a Base Station (BS) and a user equipment (UE), comprising the following steps:
1): presetting a pre-measurement dataset to be W=[ω(1), ω(2)], Γ=[γ(1), γ(2)];

2): presetting a target Signal to Noise Ratio (SNR) to be $\gamma^*$, wherein the target SNR is used to find a candidate beam vector w(k) for reliable communication between the BS and a user;

3): presetting a tracking error to be $\delta$;

4): presetting a small positive constant to be $\sigma$;

5): presetting a maximum measurement iteration count to be $t_{max}$;

6): presetting differential evolution algorithm-based estimation parameters to be $\varphi(0)$, $\eta$, $\rho$, $\mu$ and $\lambda$;

7): t=1, $\hat{\varphi}(k)=\varphi(0)$, for t<$t_{max}$;

8): calculating $\hat{\varphi}(k)=\hat{\varphi}(k-1)+$ $$\frac{\eta\Delta\omega(k-1)}{\mu+\|\Delta\omega(k-1)\|^2}$$

[$\Delta\gamma(k-1)-\hat{\varphi}^T(k-1)\Delta\omega(k-1)$], wherein $\gamma(k)=\gamma(k-1)+\hat{\varphi}^T(k)\Delta\omega(k)$;

9): if $\text{sign}(\hat{\varphi}(k+1))\neq\text{sign}(\varphi_0)\text{sign}(\hat{\varphi}(k+1))\neq(\varphi_0))$ or $\|\Delta\omega(k)\|^2<=\sigma$, or $|\hat{\varphi}(k+1)|<=\sigma$, determining that $\hat{\varphi}(k+1)=\varphi_0$;

10): $\omega(k)\leftarrow\omega(k-1)+$ $$\frac{\rho\hat{\varphi}(k)}{\lambda+\|\hat{\varphi}(k)\|^2}$$

[$\gamma^*-\gamma(k-1)$], and calculating $\gamma(k+1)$ for given $\omega(k+1)$ at UE;

11: if $|\gamma(k+1)-\gamma^*|\leq\delta$, stopping calculation, if not, $$\Gamma(k+1) \leftarrow [\Gamma(k), \gamma(k+1)]W \leftarrow [W, \omega(k+1)]t \leftarrow t+1, k \leftarrow k+1;$$

and

12): returning $\Gamma(k)$ measured at the UE, where $\gamma(k)$ is a received SNR at the UE, $\omega(k)$ is a codebook used at UE, t is a present iteration count, $\hat{\varphi}(k)$ is a Pseudo-Partial Derivative (PPD), $(\bullet)^T$ represents transpose, $$\Delta\gamma(k) = \gamma(k) - \gamma(k-1), \Delta\omega(k) = \omega(k) - \omega(k-1), \Delta\omega(k) \neq 0,$$

and a form of an array steering vector is $$u_t(\theta_n) = \frac{1}{\sqrt{N_t}}\left[1, e^{-j\frac{2\pi}{N_t}\left(n-\frac{N_t+1}{2}\right)}, e^{-j\frac{2\pi}{N_t}2\left(n-\frac{N_t+1}{2}\right)}, \ldots, e^{-j\frac{2\pi}{N_t}(N_t-1)\left(n-\frac{N_t+1}{2}\right)}\right]^T.$$

2. The data-driven beam tracking method for the mobile mmWave communication system according to claim 1, wherein the array steering vector is added to a quantified angle subset to design a codebook W={$\omega(1)$, $\omega(2)$, ..., $\omega(N)$} into $$W = \left\{\frac{1}{\sqrt{N_t/N}}\sum_{p=1}^{N_t/N} u_t(\theta_p)e^{j\delta p},\right.$$

$$\left.\frac{1}{\sqrt{N_t/N}}\sum_{p=N_t/N+1}^{2N_t/N} u_t(\theta_p)e^{j\delta p}, \ldots, \frac{1}{\sqrt{N_t/N}}\sum_{p=N_t-N_t/N+1}^{N_t} u_t(\theta_p)e^{j\delta p}\right\},$$

where N is a number of codewords in the codebook, and $\delta$ is a variable configured to control an array weight to keep a main lobe directivity gain constant as much as possible.

3. The data-driven beam tracking method for the mobile mmWave communication system according to claim 1, wherein, for further reducing complexity of beam tracking, weight vectors that are the same in shape but different in turning angle are generated by use of a beam rotation technology, all the weight vectors being calculated only based on the same weight vector: $\omega(i)=\omega(1)o\sqrt{N_t}u_t((i-1)\Psi)$, where, for $2\leq i\leq N$, $o$ represents a Hadamard product, and $\Psi$ is a beam width of the weight vector in the codebook.

4. The data-driven beam tracking method for the mobile mmWave communication system according to claim 1, wherein the PPD $\hat{\varphi}(k)=[\hat{\varphi}_1(k), \hat{\varphi}_2(k), \ldots, \hat{\varphi}_{N_t}(k)]^T$ is a PPD measured for the k-th time, $\|\hat{\varphi}(k)\|^2\leq c$.

5. The data-driven beam tracking method for the mobile mmWave communication system according to claim 4, wherein the PPD parameter $\Phi(k)$ is estimated by use of an improved projection algorithm; a standard function for PPD estimation is:

$$J(\hat{\varphi}(k))=|\Delta\gamma(k-1)-\hat{\varphi}^T(k)\Delta\omega(k-1)|^2+\mu\|\hat{\varphi}^T(k)-\hat{\varphi}^T(k-1)\|^2,$$

where $\mu>0$ is a weight factor; and an optimal condition $$\frac{\partial J(\hat{\varphi}(k))}{\partial \hat{\varphi}(k)} = 0$$

is solved to obtain $$\hat{\varphi}(k) = \hat{\varphi}(k-1) + \frac{\eta\Delta\omega(k-1)}{\mu+\|\Delta\omega(k-1)\|^2}\left[\Delta\gamma(k-1) - \hat{\varphi}^T(k-1)\Delta\omega(k-1)\right],$$

where $\eta$ is a step length constant.

6. A data-driven beam tracking device for a mobile Millimeter Wave (mmWave) communication system comprising a Base Station (BS) and a user equipment (UE), comprising:

at least one processor; and a memory coupled to the at least one processor and storing at least one computer executable instruction thereon which, when executed by the at least one processor, causes the at least one processor to:

preset a pre-measurement dataset to be W=[$\omega(1)$, $\omega(2)$], $\Gamma$=[$\gamma(1)$, $\gamma(2)$];

preset a target SNR to be $\gamma^*$, wherein the target SNR is to find a candidate beam vector $\omega(k)$ for reliable communication between the BS and a user;

preset a tracking error to be $\delta$;

preset a small positive constant to be $\sigma$;

preset a maximum measurement iteration count to be $t_{max}$;

preset differential evolution algorithm-based estimation parameters to be $\varphi(0)$, $\eta$, $\rho$, $\mu$ and $\lambda$; and execute the following calculation steps according to the parameters preset and numerical values thereof:
t=1, $\hat{\varphi}(k)=\varphi(0)$, for t<$t_{max}$;
calculating $$\hat{\varphi}(k) = \hat{\varphi}(k-1) + \frac{\eta \Delta \omega(k-1)}{\mu + \|\Delta \omega(k-1)\|^2} [\Delta \gamma(k-1) - \hat{\varphi}^T(k-1)\Delta \omega(k-1)],$$

wherein $\gamma(k)=\gamma(k-1)+\hat{\varphi}^T(k)\Delta\omega(k)$;
if $\text{sign}(\hat{\varphi}(k+1)) \neq \text{sign}(\varphi(0))$ or $\|\Delta\omega(k)\|^2 <= \sigma$ or $|\hat{\varphi}(k+1)| <= \sigma$, determining that $\hat{\varphi}(k+1)=\varphi(0)$;

$$\omega(k) \leftarrow \omega(k-1) + \frac{\rho \hat{\varphi}(k)}{\lambda + \|\hat{\varphi}(k)\|^2} [\gamma^* - \gamma(k-1)]$$

and calculating $\gamma(k+1)$ for given
ω(k+1) at the UE;
if $|\gamma(k+1)-\gamma^*| \leq \delta$, stopping calculation, if not, $$\Gamma(k+1) \leftarrow [\Gamma(k), \gamma(k+1)] W \leftarrow [W, \omega(k+1)] t \leftarrow t+1, k \leftarrow k+1;$$

and
returning $\Gamma(k)$ measured at the UE,
where $\gamma(k)$ is a received SNR at the UE, ω(k) is codebook used at UE, t is a present iteration count, $\hat{\varphi}(k)$ is a Pseudo-Partial Derivative (PPD), $(\cdot)^T$ represents transpose, and $$\Delta\gamma(k) = \gamma(k) - \gamma(k-1), \Delta\omega(k) = \omega(k) - \omega(k-1), \Delta\omega(k) \neq 0,$$

and a form of an array steering vector is $$u_t(\theta_n) = \frac{1}{\sqrt{N_t}} \left[ 1, e^{-j\frac{2\pi}{N_t}\left(n-\frac{N_t+1}{2}\right)}, e^{-j\frac{2\pi}{N_t}2\left(n-\frac{N_t+1}{2}\right)}, \ldots, e^{-j\frac{2\pi}{N_t}(N_t-1)\left(n-\frac{N_t+1}{2}\right)} \right]^T.$$

7. The data-driven beam tracking device for the mobile mmWave communication system according to claim 6, wherein the at least one processor is further configured to add the array steering vector to a quantified angle subset to design a codebook W={ω(1), ω(2), . . . , ω(N)} into:

$$W = \left\{ \frac{1}{\sqrt{N_t/N}} \sum_{p=1}^{N_t/N} u_t(\theta_p) e^{j\delta p}, \frac{1}{\sqrt{N_t/N}} \sum_{p=N_t/N+1}^{2N_t/N} u_t(\theta_p) e^{j\delta p}, \ldots, \frac{1}{\sqrt{N_t/N}} \sum_{p=N_t-N_t/N+1}^{N_t} u_t(\theta_p) e^{j\delta p} \right\},$$

where N is a number of codewords in the codebook, and δ is a variable configured to control an array weight to keep a main lobe directivity gain constant as much as possible.

8. The data-driven beam tracking device for the mobile mmWave communication system according to claim 6, wherein, for further reducing complexity of beam tracking, the at least one processor is further configured to generate weight vectors that are the same in shape but different in turning angle by use of a beam rotation technology, all the weight vectors being calculated only based on the same weight vector: $\omega(i)=\omega(1) o \sqrt{N_t} u_t((i-1)\Psi)$,
where, for 2≤i ≤N, o represents a Hadamard product, and Ψ is a beam width of the weight vector in the codebook.

9. The data-driven beam tracking device for the mobile mmWave communication system according to claim 6, wherein the at least one processor is further configured to set the PPD $\hat{\varphi}(k)=[\hat{\varphi}_1(k), \hat{\varphi}_2(k), \ldots, \hat{\varphi}_{N_t}(k)]^T$ to be a PPD measured for the k-th time, $\|\hat{\varphi}(k)\|^2 \leq c$.

10. The data-driven beam tracking device for the mobile mmWave communication system according to claim 9, wherein the at least one processor is further configured to estimate the PPD parameter Φ(k) by use of an improved projection algorithm;
where μ>0 is a weight factor; and an optimal condition $$\frac{\partial J(\hat{\varphi}(k))}{\partial \hat{\varphi}(k)} = 0$$

is solved to obtain $$\hat{\varphi}(k) = \hat{\varphi}(k-1) + \frac{\eta \Delta \omega(k-1)}{\mu + \|\Delta \omega(k-1)\|^2} [\Delta \gamma(k-1) - \hat{\varphi}^T(k-1)\Delta \omega(k-1)],$$

where η is a step length constant.

11. A non-transitory computer-readable storage medium storing a computer program which is for a mobile Millimeter Wave (mmWave) communication system comprising a Base Station (BS) and a user equipment (UE), when executed by a processor, causes the processor to:
preset a pre-measurement dataset to be W=[ω(1), ω(2)], Γ=[γ(1), γ(2)];
preset a target SNR to be $\gamma^*$, wherein the target SNR is to find a candidate beam
vector ω(k) for reliable communication between the BS and a user;
preset a tracking error to be δ;
preset a small positive constant to be σ;
preset a maximum measurement iteration count to be $t_{max}$;
preset differential evolution algorithm-based estimation parameters to be $\varphi(0)$, η, ρ, μ and λ; and
execute the following calculation steps according to the parameters preset and numerical values thereof:
t=1, $\hat{\varphi}(k)=\varphi(0)$, for t<$t_{max}$;
calculating $$\hat{\varphi}(k) = \hat{\varphi}(k-1) + \frac{\eta \Delta \omega(k-1)}{\mu + \|\Delta \omega(k-1)\|^2} [\Delta \gamma(k-1) - \hat{\varphi}^T(k-1)\Delta \omega(k-1)],$$

wherein $\gamma(k)=\gamma(k-1)+\hat{\varphi}^T(k)\Delta\omega(k)$;
if $\text{sign}(\hat{\varphi}(k+1)) \neq \text{sign}(\varphi(0))$ or $\|\Delta\omega(k)\|^2 <= \sigma$ or $|\hat{\varphi}(k+1)| <= \sigma$, determining that $\hat{\varphi}(k+1)=\varphi(0)$;

$$\omega(k) \leftarrow \omega(k-1) + \frac{\rho \hat{\varphi}(k)}{\lambda + \|\hat{\varphi}(k)\|^2} [\gamma^* - \gamma(k-1)]$$

ω(k+1) at the UE;

if |γ(k+1)−γ*|≤δ, stopping calculation, if not, $$\Gamma(k+1) \leftarrow [\Gamma(k), \gamma(k+1)] W \leftarrow [W, \omega(k+1)] t \leftarrow t+1, k \leftarrow k+1;$$

and returning Γ(k) measured at the UE, where γ(k) is a received SNR at the UE, ω(k) is codebook used at UE, t is a present iteration count, $\hat{\varphi}(k)$ is a Pseudo-Partial Derivative (PPD), $(\bullet)^T$ represents transpose, $$\Delta\gamma(k) = \gamma(k) - \gamma(k-1),$$

$$\Delta\omega(k) = \omega(k) - \omega(k-1), \Delta\omega(k) \neq 0,$$

and a form of an array steering vector is $$u_t(\theta_n) = \frac{1}{\sqrt{N_t}} \left[ 1, e^{-j\frac{2\pi}{N_t}\left(n-\frac{N_t+1}{2}\right)}, e^{-j\frac{2\pi}{N_t}2\left(n-\frac{N_t+1}{2}\right)}, \ldots, e^{-j\frac{2\pi}{N_t}(N_t-1)\left(n-\frac{N_t+1}{2}\right)} \right]^T.$$

12. The non-transitory computer-readable storage medium according to claim 11, wherein the computer program is further executed by the processor to:

add the array steering vector to a quantified angle subset to design a codebook W={ω(1), ω(2), . . . , ω(N)} into:

$$W = \left\{ \frac{1}{\sqrt{N_t/N}} \sum_{p=1}^{N_t/N} u_t(\theta_p) e^{j\delta p}, \frac{1}{\sqrt{N_t/N}} \sum_{p=N_t/N+1}^{2N_t/N} u_t(\theta_p) e^{j\delta p}, \ldots, \frac{1}{\sqrt{N_t/N}} \sum_{p=N_t-N_t/N+1}^{N_t} u_t(\theta_p) e^{j\delta p} \right\},$$

where N is a number of codewords in the codebook, and δ is a variable configured to control an array weight to keep a main lobe directivity gain constant as much as possible.

13. The non-transitory computer-readable storage medium according to claim 11, wherein the computer program is further executed by the processor to: for further reducing complexity of beam tracking, the at least one processor is further configured to generate weight vectors that are the same in shape but different in turning angle by use of a beam rotation technology, all the weight vectors being calculated only based on the same weight vector: ω(i)=ω(1)o√N_t u_t((i−1)Ψ), where, for 2≤i ≤N, o represents a Hadamard product, and Ψ is a beam width of the weight vector in the codebook.

14. The non-transitory computer-readable storage medium according to claim 11, wherein the computer program is further executed by the processor to:
set the PPD $\hat{\varphi}(k)=[\hat{\varphi}_1(k), \hat{\varphi}_2(k), \ldots, \hat{\varphi}_{N_t}(k)]^T$ to be a PPD measured for the k-th time, $\|\hat{\varphi}(k)\|^2 \leq c$.

15. The non-transitory computer-readable storage medium according to claim 14, wherein the computer program is further executed by the processor to:

estimate the PPD parameter Φ (k) by use of an improved projection algorithm; a standard function for PPD estimation:
J($\hat{\varphi}$(k))=|Δγ(k−1)−$\hat{\varphi}^T$(k)Δω(k−1)|²+μ∥$\hat{\varphi}^T$(k)−$\hat{\varphi}^T$(k−1)∥², where μ>0 is a weight factor; and an optimal condition $$\frac{\partial J(\hat{\varphi}(k))}{\partial \hat{\varphi}(k)} = 0$$

is solved to obtain $$\hat{\varphi}(k) = \hat{\varphi}(k-1) + \frac{\eta \Delta\omega(k-1)}{\mu + \|\Delta\omega(k-1)\|^2} \left[ \Delta\gamma(k-1) - \hat{\varphi}^T(k-1)\Delta\omega(k-1) \right],$$

where η is a step length constant.

\* \* \* \* \*